United States Patent
Laudrain

(10) Patent No.: US 9,827,716 B2
(45) Date of Patent: Nov. 28, 2017

(54) PROCESS AND DEVICE FOR DIRECT FABRICATION OF A PART ON A STRUCTURE

(71) Applicant: Airbus Operations (SAS), Toulouse (FR)

(72) Inventor: Yann-Henri Laudrain, La Turballe (FR)

(73) Assignee: Airbus Operations (SAS), Toulouse (FR)

( * ) Notice: Subject to any disclaimer, the term of this patent is extended or adjusted under 35 U.S.C. 154(b) by 285 days.

(21) Appl. No.: 14/730,401

(22) Filed: Jun. 4, 2015

(65) Prior Publication Data

US 2015/0367579 A1    Dec. 24, 2015

(30) Foreign Application Priority Data

Jun. 23, 2014  (FR) ..................................... 14 55753

(51) Int. Cl.
*B29C 67/00* (2017.01)
*G05B 19/4099* (2006.01)
(Continued)

(52) U.S. Cl.
CPC ........ *B29C 67/0088* (2013.01); *B29C 64/386* (2017.08); *B64F 5/10* (2017.01);
(Continued)

(58) Field of Classification Search
CPC ....... B29C 67/0088; B64F 5/10; G06T 17/20; G06T 7/001; G06T 2207/10028;
(Continued)

(56) References Cited

U.S. PATENT DOCUMENTS 4,288,849 A * 9/1981 Yoshida ............. G05B 19/4185
                                                        318/562
4,575,637 A * 3/1986 Sullivan, Jr. ........... B25J 9/1697
                                                        250/237 R
(Continued)

FOREIGN PATENT DOCUMENTS

EP    2527257    11/2012
EP    2537642    12/2012
(Continued)

OTHER PUBLICATIONS

French Search Report, dated Mar. 5, 2015.
(Continued)

*Primary Examiner* — Ramesh Patel
(74) *Attorney, Agent, or Firm* — Greer, Burns & Crain, Ltd.

(57) ABSTRACT

A process for direct fabrication of a part at a predetermined structural position. The process comprises: a) scanning, via a three-dimensional scanner, the structure in the region of the predetermined position; b) comparing a virtual surface mesh of the predetermined position with a real surface mesh of the predetermined position, the real surface mesh calculated based on data obtained from the scanning; c) determining the gaps between the two meshes; d) calculating the data for modeling an inserted part, the dimensions of which fill up the determined gaps, to obtain an inserted part model; e) merging of a virtual model of a part, linked with the predetermined position, with the inserted part model, to obtain a model adjusted to the geometry of the structure in the region of the predetermined position; f) fabricating, by material deposition, an adjusted part at the predetermined position based on the adjusted model.

18 Claims, 7 Drawing Sheets

(51) Int. Cl.
   *G06T 7/00*      (2017.01)
   *G06T 17/20*     (2006.01)
   *B64F 5/10*      (2017.01)
   *B29C 64/386*    (2017.01)
   *B33Y 50/02*     (2015.01)

(52) U.S. Cl.
   CPC .......... *G05B 19/4099* (2013.01); *G06T 7/001* (2013.01); *G06T 17/20* (2013.01); *B33Y 50/02* (2014.12); *G05B 2219/37205* (2013.01); *G05B 2219/40613* (2013.01); *G06T 2207/10028* (2013.01); *G06T 2207/30164* (2013.01)

(58) Field of Classification Search
   CPC ...... G06T 2207/30164; G05B 19/4099; G05B 2219/37205; G05B 2219/40613; B33Y 50/02
   See application file for complete search history.

(56) References Cited

U.S. PATENT DOCUMENTS

| | | | | | |
|---|---|---|---|---|---|
| 4,995,087 | A * | 2/1991 | Rathi | ................... | B23K 26/032 382/152 |
| 4,998,005 | A * | 3/1991 | Rathi | ................... | B23K 26/032 219/121.62 |
| 8,473,255 | B2 * | 6/2013 | Cazals | ................... | G06T 17/00 703/1 |
| 2008/0205763 | A1 | 8/2008 | Marsh et al. | | |
| 2010/0030538 | A1 * | 2/2010 | Cazals | ................... | G06T 17/00 703/6 |
| 2012/0300093 | A1 | 11/2012 | Laudrain et al. | | |
| 2013/0015596 | A1 * | 1/2013 | Mozeika | ................ | B25J 9/0084 264/40.1 |
| 2013/0313743 | A1 * | 11/2013 | Rockhold | ........... | B29C 67/0055 264/40.1 |
| 2014/0117575 | A1 * | 5/2014 | Kemperle | ........... | B29C 67/0055 264/40.7 |
| 2015/0273631 | A1 * | 10/2015 | Kenney | ................. | B22F 3/1055 419/53 |
| 2016/0321384 | A1 * | 11/2016 | Pal | ....................... | G06F 17/5018 |

FOREIGN PATENT DOCUMENTS

| | | |
|---|---|---|
| FR | 2907944 | 5/2008 |
| WO | 2009044362 | 4/2009 |

OTHER PUBLICATIONS

"CERC—Wikipedia" Anonymous, Nov. 29, 2014.
"Modeling of a fitting inlay from various information" Adolph et al., Nov. 23, 2001.

* cited by examiner

PROCESS AND DEVICE FOR DIRECT FABRICATION OF A PART ON A STRUCTURE

CROSS-REFERENCES TO RELATED APPLICATIONS

This application claims the benefit of the French patent application No. 1455753 filed on Jun. 23, 2014, the entire disclosures of which are incorporated herein by way of reference.

BACKGROUND OF THE INVENTION

The present invention concerns a process enabling the direct fabrication of at least one part on a structure, in particular an aircraft fuselage, and a device for implementing this process.

A fuselage includes a primary structure, formed, in particular, of transverse frames and of longitudinal stringers, of an external skin supported by the primary structure, and also of a floor fixed to the primary structure. At the time of fabrication of the fuselage at a production site, numerous parts of various types are fixed to the primary structure in order to reinforce it, such as, for example, a linking plate and a backing plate, fixed to one another at the juncture between two coplanar frames and clasping said two frames in order to couple them to one another.

At present, the parts to be fixed are fabricated by various entities outside the production site and are then conveyed to the latter where they are put away in the warehouse of the production site. Prior to the fixing of the part to the fuselage by screwing or riveting, the operators have to go and look for the parts in the warehouse in order to transport them into the fuselage to a position where they have to be fixed, they have to set these parts by means of liquid or pasty setting, necessitating a significant drying-time, in order to take into account the defects of contact between the primary structure and the part, said defects being due to the clearances (less than one millimeter) inherent in the jointing of elements of large dimensions. These measures slow down the rate of production of the fuselages.

One solution to this problem would be to fabricate the parts directly on the fuselage at the place where they have to be fixed. From document EP 2 537 642 a device is known for printing of parts in 3D, but this device is arranged in a closed enclosure specifically dedicated to the printing, and only enables a part to be fabricated in accordance with a predetermined template, the part fabricated in this way (necessitating a machining phase in order to extract it from its support plate) still having to be conveyed to the production site and then set.

SUMMARY OF THE INVENTION

One of the objects of the present invention is to find a remedy, in full or in part, for the aforementioned drawback. To this end, the present document concerns a process for direct fabrication of at least one part at a predetermined position on a structure, said process comprising the following successive steps:

a) scanning, via a three-dimensional scanner, of the structure in the region of the predetermined position;

b) comparison, by a central unit, of a virtual surface mesh of the predetermined position with a real surface mesh of said predetermined position, said real surface mesh being calculated by the central unit on the basis of data obtained subsequent to the scanning carried out in step a);

c) determination, by the central unit, of the gaps between said two meshes;

d) calculation, by the central unit, of the data for modeling a part, called the inserted part, the dimensions of which fill up said gaps calculated in step c), in order to obtain a model of an inserted part;

e) merging, by the central unit, of a virtual model of a part, linked with said predetermined position, with the model of the inserted part, calculated in step d) in order to obtain a model of a part, called the adjusted model, adjusted to the geometry of the structure in the region of the predetermined position;

f) fabrication, by deposition of material by deposition means, of the adjusted part at the position on the basis of the adjusted model calculated in step e).

BRIEF DESCRIPTION OF THE DRAWINGS

The characteristics of the invention that are mentioned below, as well as others, will be more clearly apparent from the following description of embodiments, said description being drawn up in relation to the appended drawings, in which.

DETAILED DESCRIPTION OF THE PREFERRED EMBODIMENTS

Figure 1:
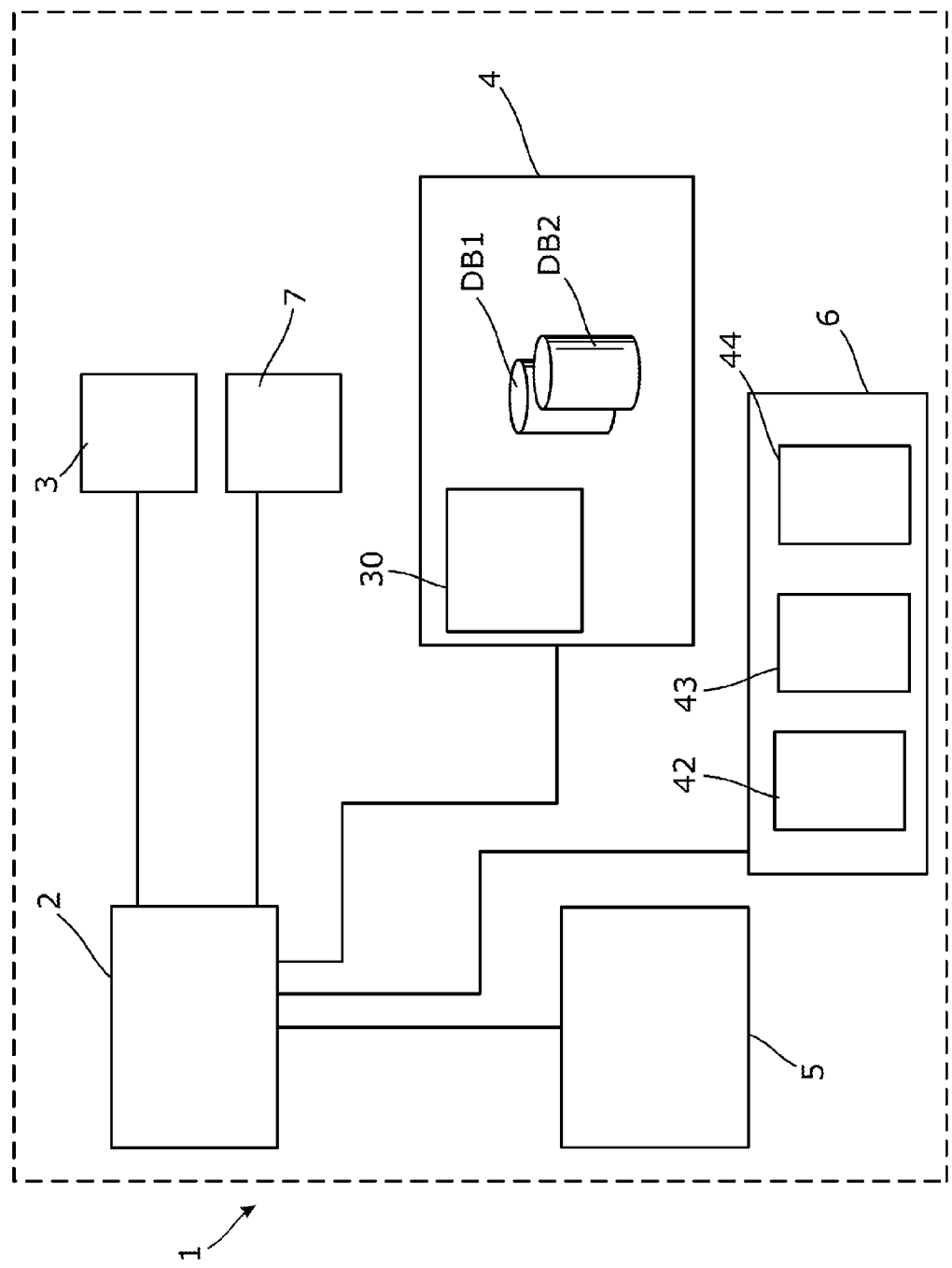
FIG. 1 is a block diagram of the device for direct deposition of a part at a predetermined position on a structure by deposition of material, according to an embodiment of the invention.
Figure 2:
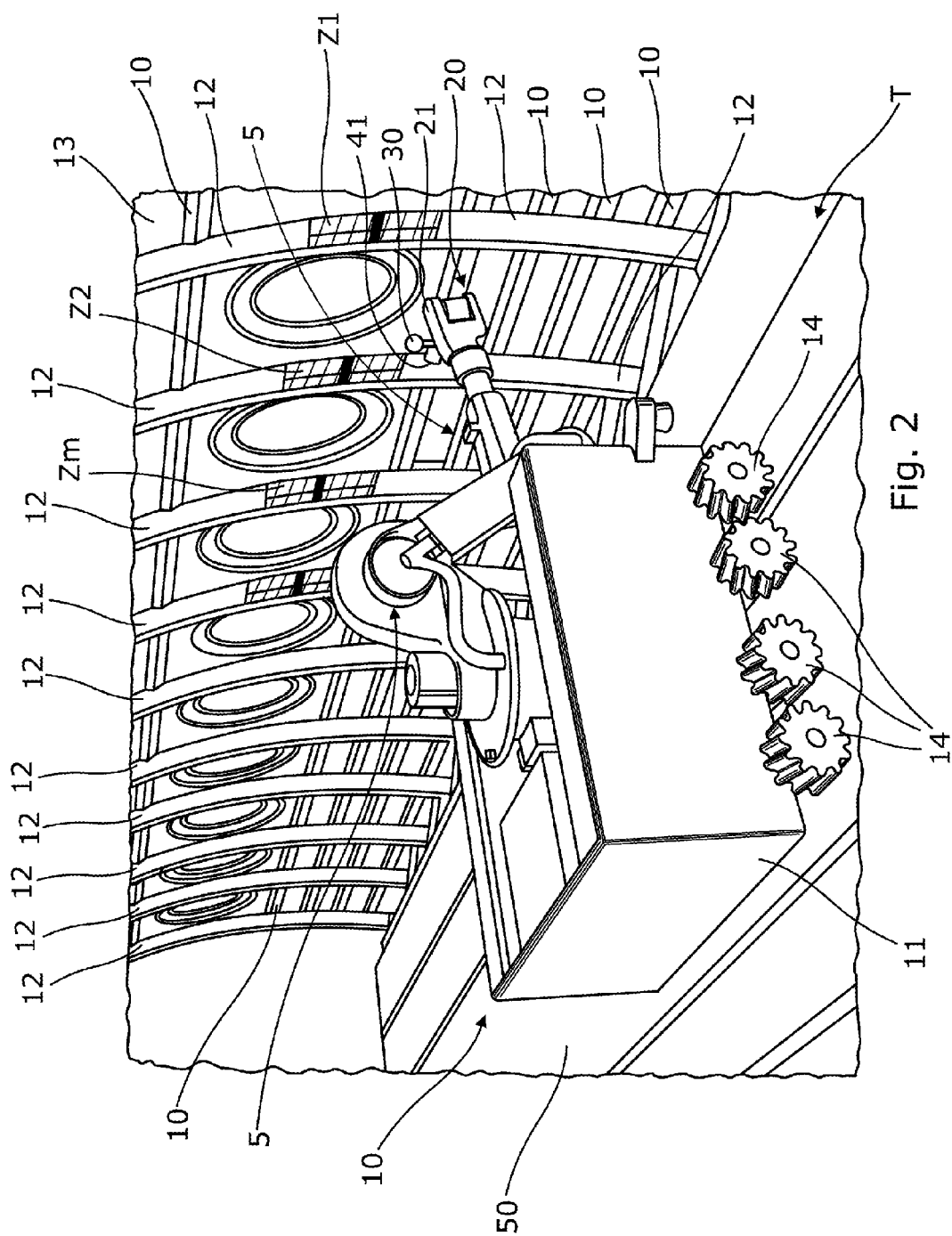
FIG. 2 is a schematic view of an embodiment of the device shown in FIG. 1, arranged within a fuselage.

With reference to FIG. 1, the device 1 according to the invention comprises a central unit 2 controlling a displacement arrangement 3 designed to displace the device 1, measurement means 4, means 6 for deposition of material which are linked with an articulated arm 5, as well as a positioning unit 7 providing data to the central unit 2 about the position of the device 1. As represented in FIG. 2, the device 1 takes the form of an autonomous mobile robot 10 including a chassis 11 of parallelipipedal shape mounted which is on wheels 14 and on which the articulated arm 5 is fixed.

According to the invention, this robot 10 is designed to be displaced in a fuselage T and to deposit layers of metallic or plastic material at predetermined positions Z1, Z2, . . . , Zn (n being an integer; the predetermined positions are represented by hatched zones in FIG. 2) on the fuselage T via the means 6 for deposition of material and the articulated arm 5, in order to form parts directly on said fuselage T. According to the invention, the dimensions of each of the parts fabricated by the device 1 are adjusted to the geometry of the fuselage T as a function of measurements carried out by the measurement means 4 at the place of the deposition, in order to take into account the geometric specificities (joint clearances, surface irregularities, etc.) of said fuselage T.

With reference to FIG. 1, the measurement means 4 comprise at least one three-dimensional scanner 30 configured to scan zones of the fuselage T, as well as two databases DB1, DB2 each containing data, in the form of coordinates of points, obtained by three-dimensional assisted modeling of a virtual fuselage Tg which is a generic model of the fuselage T. Unlike the real fuselage T, the virtual fuselage Tg is a perfect model, the joints of which between the elements constituting it exhibit no clearance.

The data of the first database DB1 comprise the modeling of all the elements forming the virtual fuselage Tg, in particular its primary structure (frames, stringers, skin, crosspieces etc.) and its secondary structure (floor, supports, pillars, etc.). In addition, sets of adjacent points representing the predetermined positions Z1, . . . , Zn on the virtual fuselage Tg are recorded in the first database DB1.

Figure 3:
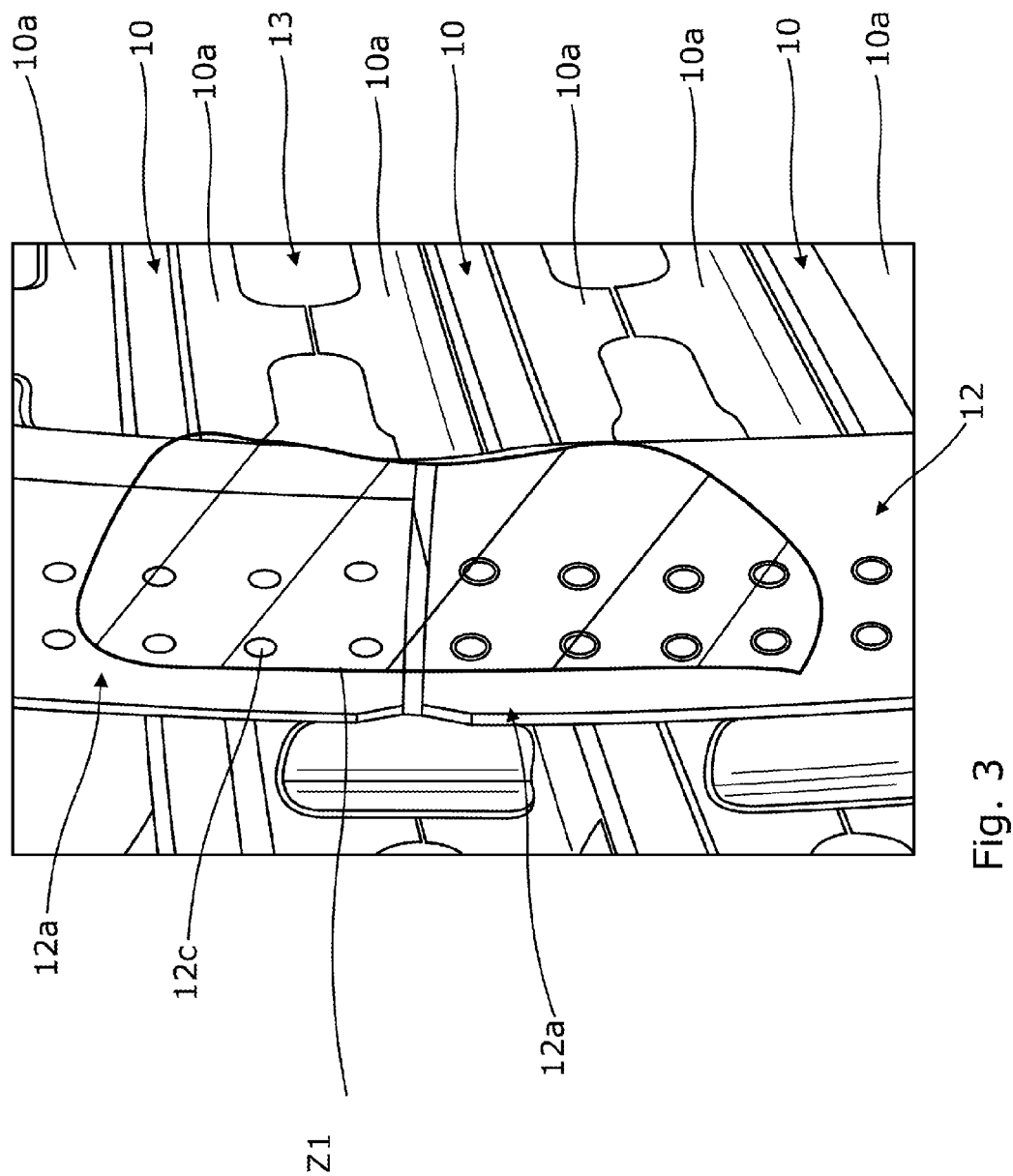
FIG. 3 is a schematic view of a predetermined position on the fuselage, at which a linking plate has to be fabricated by means of the device illustrated in FIG. 2.

With reference to FIG. 3, a predetermined position Z1 (hatched in FIG. 3) recorded in the first database DB1 comprises, for example, the data for three-dimensional modeling of two longitudinal stringers 10 and of two frames 12. Each of the two frames 12 rests perpendicularly on the stringers 10 in the region of the base plate 12a of the frame, and the two frames 12, although situated in the same plane, are not abutting. The skin 13 is added onto the base plate 10a of the stringers 10.

Figure 4:
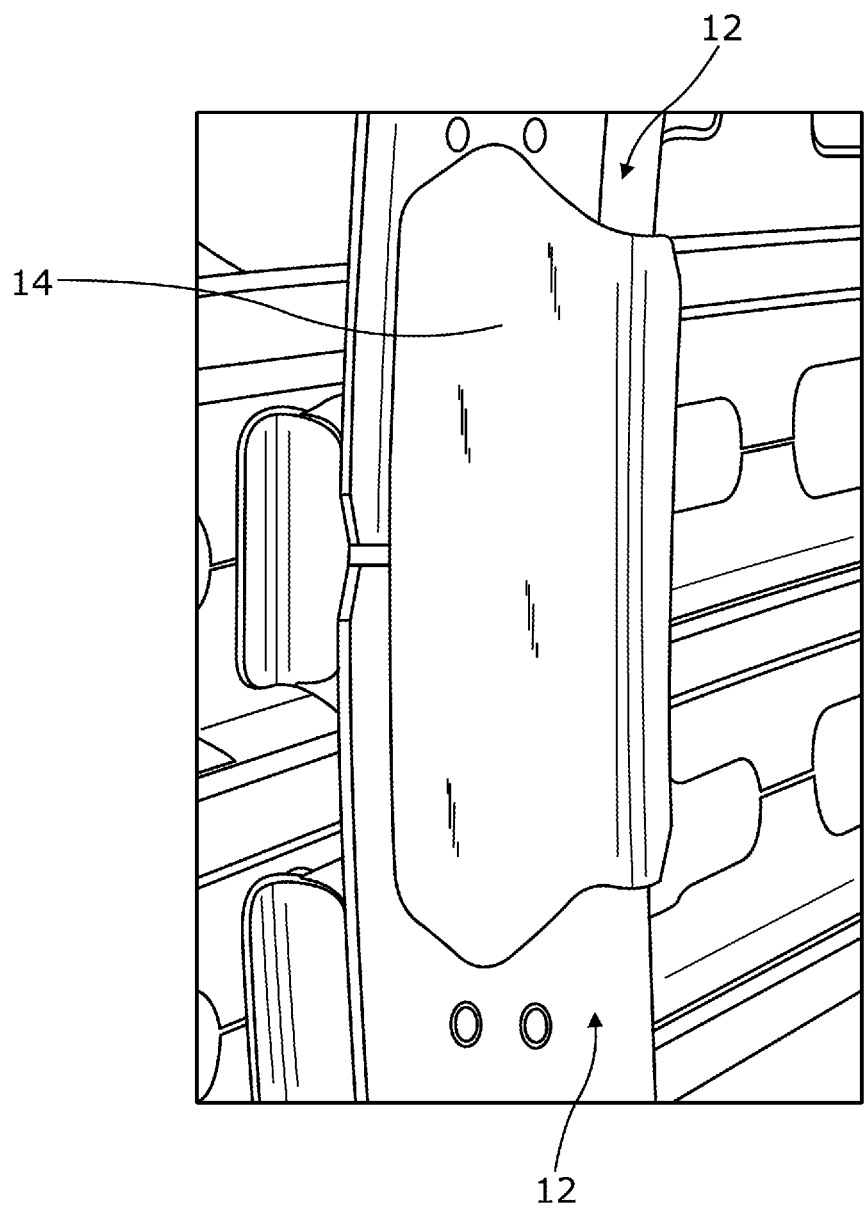
FIG. 4 is a view similar to FIG. 3, showing a virtual model of a linking plate to be fabricated at said predetermined position.

The data of the second database DB2 comprise the virtual modeling of the part (including its specifications of mechanical strength), called the virtual model of the part, to be fabricated in each predetermined zone Z1, . . . , Zn. With reference to FIG. 4, and going back to the previous example, the virtual model of the part to be fabricated in the predetermined zone Z1 corresponds to a linking plate 14 resting on each of the two frames 12, so that the linking plate 14 forms a joint between the two frames in order to couple them to one another.

In use, a three-dimensional scanner 30 is provided in order to scan zones of the fuselage T and in this way to collect real coordinates of a plurality of points of the scanned zones. The points collected are then transmitted to the central unit 2 which, in use, calculates a surface mesh, called the real mesh MR, of the scanned zone. A three-dimensional scanner 30 is preferably one using optical contactless technology of the laser type, photogrammetry or videogrammetry, and analyses a zone situated at a distance of between 5 cm and 1 m from said scanner, and can scan a zone of a diameter of 1 m at a distance of 1 m. In FIG. 2 it will be noted that the device 1 includes a single three-dimensional scanner 30 mounted at the free end 20 of the articulated arm 5. According to the invention, and as will be explained in detail further below with an example of fabrication of a linking plate, the dimensions of the virtual model of the part that is recorded in the second database DB2, said model forming a template, is adjusted by the central unit 2 as a function of the real data provided by the three-dimensional scanner 30, in order to fabricate a part adapted to the geometric specificities of the fuselage T.

The displacement arrangement 3 may comprise electric motors and servomechanisms linked with the wheels 14 and enabling these latter to be displaced.

The positioning unit 7 is of any known type and is, for example, a unit for optical positioning by analysis of images, potentially combined with a unit for positioning by wave (of radiofrequency type when radiofrequency tags are arranged on the floor of the fuselage, or of triangulation type via a meshed network for wireless communication, etc.). In use, the positioning unit 7 provides positioning data to the central unit 2 which determines the position of the device 1 in the virtual fuselage Tg on the basis of the data recorded in the first database DB1.

The means 6 for deposition of material enable the direct deposition of plastic or metallic material, layer after layer, at a predetermined position Z1, . . . , Zn, and are linked with the articulated arm 5.

Figure 5:
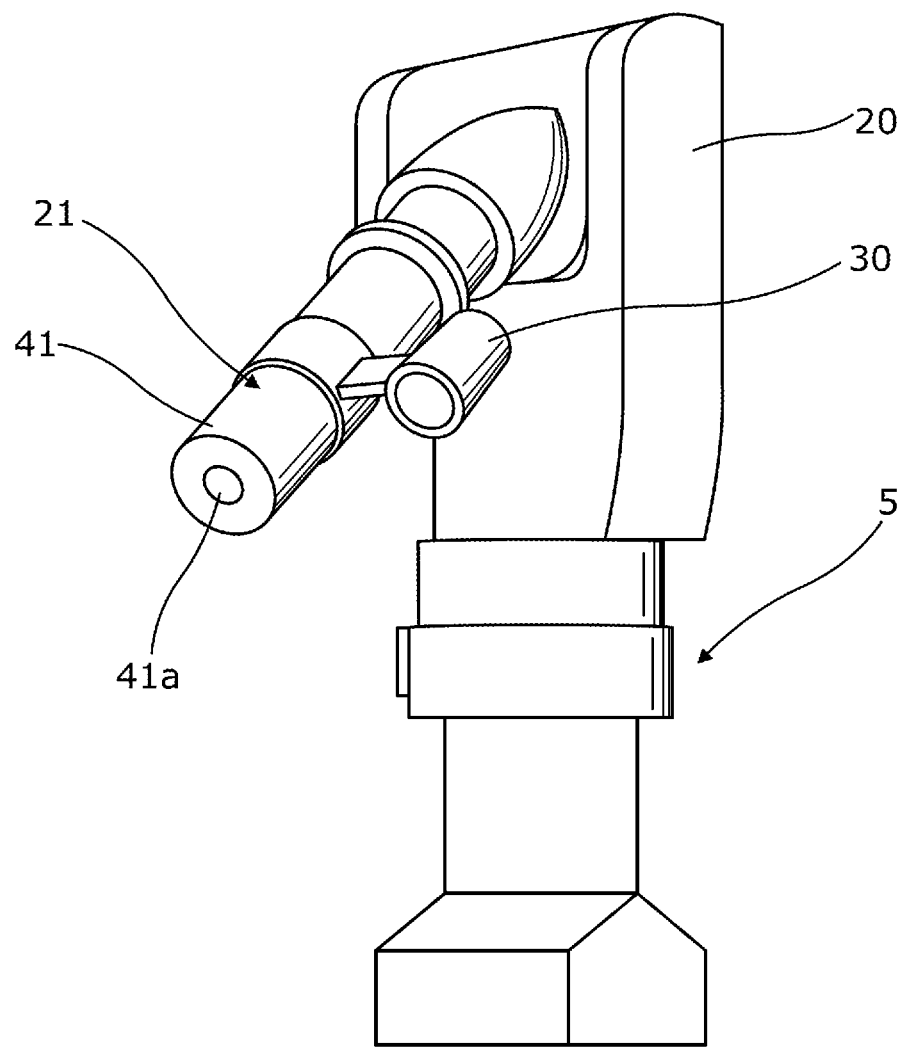
FIG. 5 is an enlargement of the device shown in FIG. 2, showing the details of an articulated arm.

Said articulated arm, illustrated in FIG. 5, comprises a pivoting head 21 fixed to the free end 20 of the arm, as well as a plurality of articulations conferring at least six degrees of freedom on the pivoting head 21, enabling this latter to be oriented and displaced in all directions with respect to the chassis 11. The movement of the articulated arm 5 is ensured by servomechanisms and motors driven by the central unit 2.

The means 6 for deposition of material are, for example, provided for the implementation of a process for direct additive laser construction by deposition of molten metallic powder, and in consequence comprise a coaxial nozzle 41 mounted at the free end of the pivoting head 21, a system 42 for distribution of metallic powder, a system 43 for distribution of neutral gas, and a laser 44 arranged in the nozzle 41 so as to emit a beam through the free aperture 41a of the nozzle.

The system 42 for distribution of metallic powder and also the system 43 for distribution of neutral gas each include a pump (not represented in the Figures) arranged in the chassis, an upstream umbilicus and a downstream umbilicus (neither of which is represented in the Figures). The upstream umbilicus links up the pump to a reservoir which is external to the device 1, respectively for metallic powder or for neutral gas. As far as the downstream umbilicus is concerned, it is fixed to the articulated arm 5, and links up the pump to the nozzle 41, so that, respectively, grains of the metallic powder or the neutral gas can be ejected via the free aperture 41a of the nozzle under the influence of the pump.

By way of example, the neutral gas that is used is argon, the grains constituting the metallic powder are spherical with a grain size of between 45 μm and 150 μm when the metal is, for example, a grade of titanium or of aluminum. The laser 44 has a mean power of between 500 watts and 6000 watts.

Figure 6:
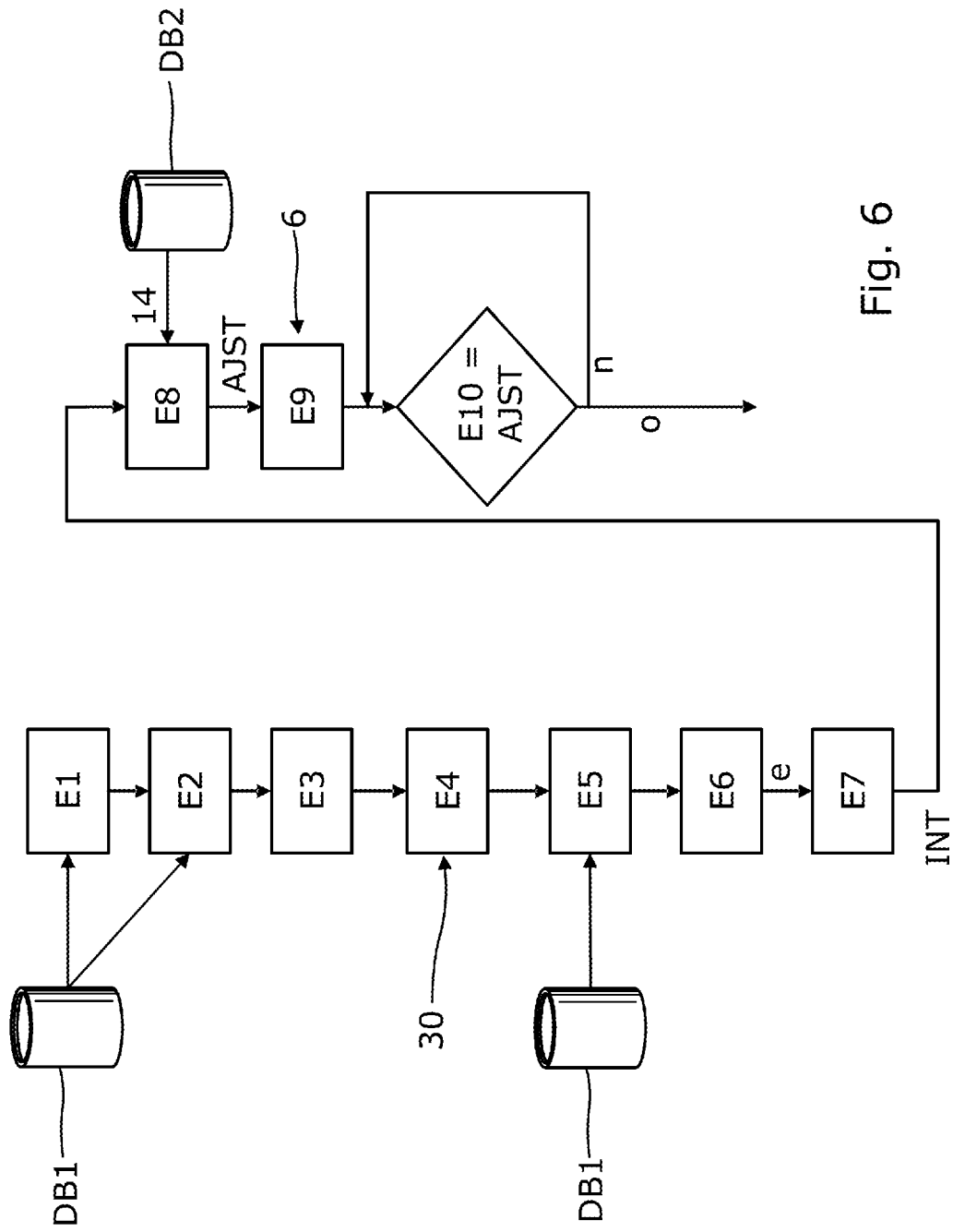
FIG. 6 is a diagram illustrating a use of the device according to the invention for the fabrication of a linking plate at the predetermined position in FIG. 3.

The fabrication, by means of the device 1, of a metallic linking plate at the juncture between two frames 12 at a predetermined position Z1, in order to couple the two frames 12 to one another, will now be described with reference to FIG. 6. It will be assumed that the device 1 according to the invention is disposed on the floor 50 of a fuselage T.

In a first step E1, which corresponds to the start-up of the device 1, the central unit 2 implements a dedicated program in order to fabricate a metallic linking plate directly at a predetermined position Z1 on a fuselage T, said position being modeled in the first database DB1.

According to the program implemented by the central unit 2, this latter uses the modeling data of the first database DB1 in order to calculate the displacements and the position of the device 1 in the fuselage T on the basis of the data provided by the positioning unit 7.

In a second step E2 the central unit 2 calculates, by consulting the first database DB1, a route that the device 1 has to take in order that its articulated arm 5 has a range sufficient to reach the predetermined zone Z1. Once this calculation has been carried out, the central unit 2 sends desired values to the displacement arrangement 3, in order that the device 1 is displaced into the region of the final point of the route. It should be noted that the range of the articulated arm 5 is determined as a function of the dimensions of said arm and of the deflection of its articulations, and is a datum recorded in the memories of the central unit 2.

In a third step E3 the central unit 2 sends desired values to the motors and servomechanisms of the articulated arm 5 so as to place the nozzle 41 in the vicinity (<8 mm, according to the width of the layer to be deposited) of the predetermined zone Z1, the free end 41a of the nozzle facing towards the zone on which the metallic material has to be deposited.

In a fourth step E4 the central unit 2 puts the three-dimensional scanner 30 of the measurement means 4 into operation. Said scanner scans a zone including the predetermined position Z1, and provides to the central unit 2 the real coordinates of the points of the elements (frames 12, skin 13, stringers 10) forming the fuselage T in the region of the predetermined position Z1. On the basis of these data the central unit 2 calculates a real surface mesh, called the real mesh MR, of the predetermined position Z1.

In a fifth step E5 the central unit 2 calculates a virtual surface mesh, called the virtual mesh MV, of the predetermined position Z1 on the basis of the data of the first database DB1, and implements an algorithm for 3D resetting, in order to bring the two surface meshes, respectively the real mesh and the virtual mesh, into optimal correspondence. The algorithm for 3D resetting uses, for example, the method of least squares by considering the elements in play to be infinitely rigid, and does this in order to find the best superposition of the two meshes, under constraints that the functional sides, for example the base plate 12a of the two frames 12, of the elements of the primary structure to be coupled are aligned with the two meshes. At the conclusion of step E5 the central unit 2 links, as pair of curves, each curve of the virtual mesh with a curve of the real mesh.

In a sixth step E6, once the two meshes have been superposed the central unit 2 compares, for all the pairs of curves, the positions of the two curves pertaining to the same pair in relation to one another, and calculates the gaps e between these two positions. The presence of a gap e is symptomatic of a joint clearance between the fuselage T and the virtual fuselage Tg in the region of the predetermined position Z1.

The central unit 2 determines, in a seventh step E7 and on the basis of the gaps calculated in step E6, the data for three-dimensional modeling of a part, called the inserted part INT, which would come to be inserted in the gaps e between the two meshes. At the conclusion of this step the model of the inserted part INT is obtained.

In an eighth step E8 the central unit 2 merges, by a Boolean operation, the virtual model of the linking plate 14 which is recorded in the second database DB2 with the model of the inserted part INT, and determines a model of a part, called the adjusted model AJST, adjusted to the geometry of the fuselage T in the region of the predetermined position Z1.

In a ninth step E9 the central unit 2 controls the means 6 for deposition of material in order to form the adjusted linking plate AJST by deposition of material at the predetermined position Z1 in conformity with an optimized strategy of trajectory predetermined by simulation, ensuring, on the one hand, the specified mechanical characteristics stemming from the second database DB2, and, on the other hand, the accessibility of the device, avoiding any possible collision with the environment (structure). The laser 44 is then operational and produces a laser beam on demand. The metallic powders are conveyed to the nozzle 41 by the pump of the system 42 for distribution of metallic powder and are subjected, in the nozzle 41, to an atmosphere saturated with neutral gas ejected by the pump of the system 43 for distribution of neutral gas, in order to ward off the problems of oxidation. On account of the design of the nozzle 41, the metallic grains ejected from the nozzle 41 towards the zone to be covered are simultaneously subjected to the laser radiation, which causes them to melt. In this way, the means 6 for deposition of material deposit a homogeneous and dense deposit. During this step the articulated arm 5 is displaced in conformity with the desired values of the central unit 2 so as to totally sweep the zone to be covered.

It should be noted that the molten material (whether it be plastic or metallic) deposited on the fuselage T adheres to this latter.

Lastly, the central unit 2 compares, in a tenth step E10, via the three-dimensional scanner 30, the three-dimensional modeling of the linking plate in the course of fabrication to the modeling of the adjusted linking plate AJST calculated in step E8. Step E10 continues so long as the correspondence is not exact, to within a tolerance of one micron.

Once the correspondence has been established, the central unit 2 again performs steps E1 to E10, as previously described, for another part to be fabricated at a predetermined position Z2.

The invention enables parts to be fabricated directly on a structure via a homogeneous and precise deposition of material. The part fabricated in this way is perfectly adjusted to the geometry of the zone where the deposition takes place, and in consequence any setting operation is superfluous. In addition, the device 1 in the form of a mobile and autonomous robot 10 relieves the teams of operators for the accomplishment of lengthy and tedious tasks, and enables the rate of fabrication to be dissociated from the capacities of the chain for supply of parts. In this way, no human intervention is necessary for the use and control of the device 1, beyond possible steps for preparation of the surfaces on which metallic or plastic material will be deposited.

Besides being applicable to fuselages, the invention is applicable to the wings of an aircraft, as well as to other structures such as, for example, hulls of boats, the structure of a railway vehicle, or even in an automobile.

Although described for the realization of a linking plate, the invention enables parts of various shapes to be fabricated as a function of the data recorded in the second database DB2. The virtual parts entered into the second database DB2 are, for example, linking plates, backing plates, clips, supports etc.

In the case where the means 6 for deposition of material are provided for the implementation of a process for direct construction by deposition of molten plastic powder, said means in consequence comprise a coaxial nozzle mounted at the free end of the pivoting head, a system for distribution of plastic powder, and a laser arranged in the nozzle so as to emit a beam through the free aperture of the nozzle.

In a first variant of the invention, position sensors are arranged on the nozzle 41 and connected to the central unit. Via these sensors the central unit 2 calculates the position of the nozzle 41 and is able to modify the flow-rate of the pumps of the means 6 for deposition of material and the position of the nozzle 41, in order to correct the trajectory of the grains which is modified by gravity when the deposition of material is effected in directions other than the vertical.

Figure 7:
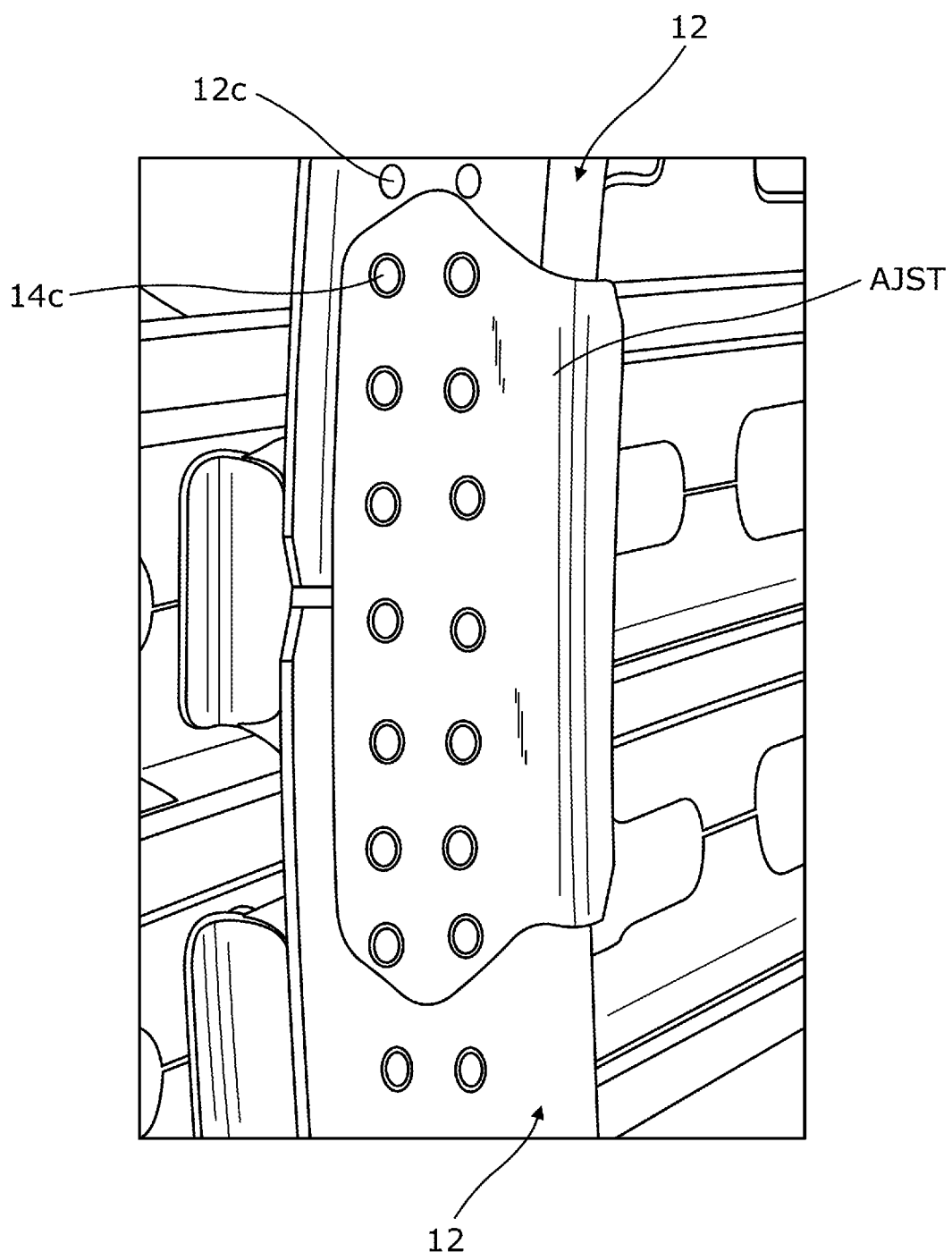
FIG. 7 is a view similar to FIG. 3, showing a linking plate fabricated by means of the device of the invention according to FIG. 2.

In a second variant of the invention and with reference to FIGS. 3 and 7 where it will be noted that through-holes 12c are arranged on each of the two frames 12, at the juncture of which a linking plate has to be fabricated, the central unit 2 implements an algorithm for recognition of holes, which enables the presence to be recognized of holes bored on the surfaces where the part to be fabricated has to rest.

This algorithm finds expression, when it is implemented, and going back to the above description of the process, in an additional step E8', directly succeeding step E8, in which the central unit 2 calculates a projection of the holes 12c of the frames scanned in step E4 on the three-dimensional modeling of the adjusted linking plate AJST.

In step E9 the adjusted linking plate AJST is fabricated while excluding a deposition of material on the projection of the holes 12c. In this way, the adjusted linking plate AJST finally fabricated includes through-holes 14c which are concentric with those 12c arranged in the frames.

This variant is advantageous, in that it enables the adjusted linking plate AJST to be fixed directly to the frame by riveting or screwing without necessitating operations for drilling said linking plate for the purpose of cleaning.

So according to this variant it is possible to fabricate directly a linking plate and a backing plate (not represented) on either side of each frame 12 in the region of the junction of two coplanar frames in which through-holes are arranged, to fix the linking plate and the backing plate to one another via screw/nut systems passing through the holes 14c, 12c, and in this way to clasp said two frames, in order to couple them to one another.

Without departing from the scope of the present invention, the device can be used in order to add geometries onto existing parts already installed, either with a view to adding local additional functions such as, for example, specific portions on generic bases, such as supports intended to route system components such as pipelines or electrical harnesses, or with a view to repairing elements of structures that have been damaged or that have been subjected, for example, to inappropriate drilling operations or that have sustained onsets of faults such as cracks, for example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process for direct fabrication of at least one part at a predetermined position on a structure, said process comprising the following successive steps:
   a) scanning, via a three-dimensional scanner, the structure in a region of the predetermined position;
   b) comparing, by a central unit, a virtual surface mesh of the predetermined position with a real surface mesh of said predetermined position, said virtual surface mesh being calculated by the central unit from modeling data recorded in a first database, and said real surface mesh being calculated by the central unit from data obtained subsequent to the scanning carried out in step a);
   c) determining, by the central unit, the existence of one or more gaps between said two meshes, said one or more gaps representing joint clearances in the structure;
   d) calculating, by the central unit, data for modeling an inserted part having dimensions which fill up said one or more gaps calculated in step c), to obtain a model of the inserted part;
   e) merging, by the central unit, a virtual model of a part, linked with said predetermined position recorded in a second database, with the model of the inserted part calculated in step d), to obtain an adjusted model of the part having geometry adjusted to the structure in the region of the predetermined position;
   f) fabricating an adjusted part based upon the adjusted model calculated in step e) by depositing material with a deposition system directly on the predetermined position.

2. The process as claimed in claim 1, wherein the process includes a step, prior to step a), of displacing in the structure, via a displacement arrangement, the three-dimensional scanner and the deposition system into the region of the predetermined position.

3. The process as claimed in claim 1, wherein the structure includes at least one hole in the region of the predetermined position scanned in step a), the process including:
   an additional step e'), succeeding step e), in which the central unit calculates a projection of the at least one hole and plots the projection of the at least one hole on the adjusted model;
   in step f), the adjusted part being fabricated while excluding a deposition of material at the location of the projection of the at least one hole, so that the fabricated adjusted part includes a through-hole which is concentric with each hole of the structure.

4. The process as claimed in claim 1, wherein step f) includes the implementation of a process for direct additive laser construction by deposition of molten metallic or plastic powder.

5. The process of claim 1 further comprising:
   receiving, by the central unit, positioning data, and wherein the central unit is configured to determine a position within the virtual structure based upon the positioning data, wherein the position data relates to a position of the device within the structure.

6. The process of claim 5 further comprising:
   obtaining, by a positioning, the positioning data of the device.

7. A device for implementation of a process for direct fabrication of at least one part at a predetermined position on a structure, comprising:
   a central unit,
   a material deposition system,
   a measuring system comprising at least one three-dimensional scanner, first database, and a second database,
   the first database comprising data for modeling a virtual structure including adjacent points representing an equivalent of said predetermined position in a model of the virtual structure, and
   the second database comprising a virtual model of a part to be fabricated at said predetermined position, said at least one scanner providing to the central unit, in use, data relating to the geometry of the predetermined position, the central unit being configured to calculate a model of an adjusted part on the basis of the virtual model and on the basis of the data provided by the at least one scanner, and to control the material deposition system for the fabrication of a part by deposition of material at the predetermined position according to the model of the adjusted part.

8. The device as claimed in claim 7, which further includes a displacement arrangement controlled by the central unit configured to selectively displace at least a portion of the material deposition system relative to the structure.

9. The device as claimed in claim 7, which includes an articulated arm, said at least one scanner being mounted on the articulated arm.

10. The device as claimed in claim 7, wherein the material deposition system includes a coaxial nozzle mounted at a free end of the articulated arm and a system for distribution of powder configured to convey the powder towards a free aperture of the coaxial nozzle.

11. The device as claimed in claim 10, wherein the powder is chosen from a plastic powder and a metallic powder.

12. The device as claimed in claim 10, wherein the powder is a metallic powder, the material deposition system includes, in addition, a system for distribution of neutral gas and a laser arranged in the nozzle so as to emit a beam through the free aperture of the nozzle.

13. The device of claim 7 further comprising:
a positioning unit configured to provide positioning data of the device to the control unit, and wherein the central unit is configured to determine a position of the device relative to the virtual structure based upon the positioning data.

14. The device of claim 13 further comprising:
a displacement arrangement linked with one or more wheels configured to displace the device within the structure.

15. A process for direct fabrication of at least one part at a predetermined position on a structure, said process comprising the following successive steps:
receiving, by a central unit, position data of a device, wherein the position data relates to a position of the device within the structure;
determining a position of the device within a virtual structure based upon the position of the device within the structure;
scanning the structure in a region of the predetermined position by the device with a three-dimensional scanner;
comparing a virtual surface mesh of the predetermined position with a real surface mesh of said predetermined position, said virtual surface mesh being calculated by the central unit from modeling data recorded in a first database, and said real surface mesh being calculated by the central unit from data obtained subsequent to the scanning;
determining, by the central unit, the existence of one or more gaps between said two meshes, said one or more gaps representing joint clearances in the structure;
calculating, by the central unit, data for modeling an inserted part having dimensions which fill up said one or more gaps, to obtain a model of the inserted part;
merging, by the central unit, a virtual model of a part, linked with said predetermined position recorded in a second database, with the model of the inserted part, to obtain an adjusted model of the part having geometry adjusted to the structure in the region of the predetermined position;
fabricating, by depositing material with a deposition system, an adjusted part directly on the predetermined position based upon the adjusted model; and,
changing the position of the device within the structure after fabricating the adjusted part directly on the predetermined position.

16. The process of claim 15, wherein the position of the device is changed to be proximate a second predetermined positioned.

17. The process of claim 16 further comprising:
scanning the structure in a region of the second predetermined position by the device with a three-dimensional scanner;
comparing a second virtual surface mesh of the second predetermined position with a second real surface mesh of said second predetermined position, said second virtual surface mesh being calculated by the central unit from modeling data recorded in a first database, and said second real surface mesh being calculated by the central unit from data obtained subsequent to the scanning of the region of the second predetermined position;
determining, by the central unit, the existence of one or more gaps between said second virtual surface mesh and second real surface mesh, said one or more gaps between said second virtual surface mesh and second real surface mesh representing joint clearances in the structure at the second predetermined position;
calculating, by the central unit, data for modeling a second inserted part having dimensions which fill up said one or more gaps between said second virtual surface mesh and second real surface mesh, to obtain a model of the second inserted part;
merging, by the central unit, a virtual model of a second part, linked with said second predetermined position recorded in a second database, with the model of the second inserted part, to obtain a second adjusted model of the part having geometry adjusted to the structure in the region of the second predetermined position; and,
fabricating, by depositing material with the deposition system, a second adjusted part directly on the second predetermined position based upon the second adjusted model.

18. The process of claim 17 wherein virtual model of the second part is different than that virtual model of the part.

* * * * *